United States Patent [19]

Chen et al.

[11] 3,797,001

[45] Mar. 12, 1974

[54] SINGLE WALL DOMAIN PROPAGATION ARRANGEMENT

[75] Inventors: Yu-Ssu Chen, New Providence; Joseph Edward Geusic, Berkeley Heights; Terence John Nelson, New Providence, all of N.J.

[73] Assignee: Bell Telephone Laboratories, Incorporated, Murray Hill, Berkeley Heights, N.J.

[22] Filed: Aug. 7, 1972

[21] Appl. No.: 278,566

[52] U.S. Cl. .................... 340/174 TF, 340/174 QA

[51] Int. Cl. .................... G11c 11/14

[58] Field of Search ................ 340/174 TF, 174 QA

[56] References Cited

UNITED STATES PATENTS

| | | | |
|---|---|---|---|
| 3,736,579 | 5/1973 | Marsh | 340/174 TF |
| 3,728,153 | 4/1973 | Heinz | 340/174 TF |
| 3,728,697 | 4/1973 | Heinz | 340/174 TF |

*Primary Examiner*—James W. Moffitt
*Attorney, Agent, or Firm*—H. M. Shapiro

[57] ABSTRACT

Field access, single wall domain propagation arrangements include channels defined by embossed permalloy layers. Lower drive fields and increased design flexibility result.

7 Claims, 10 Drawing Figures

FIG. 1
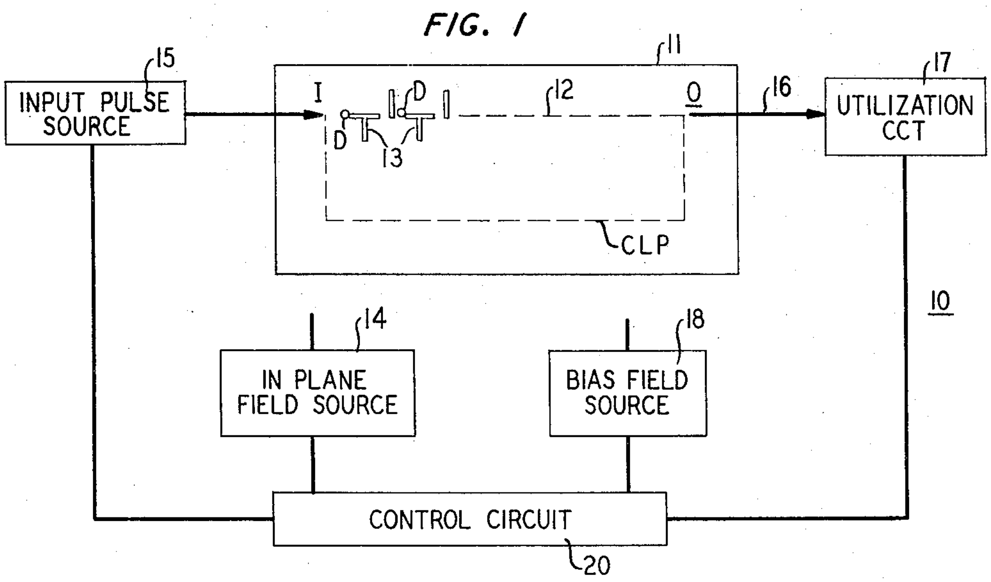
FIG. 2
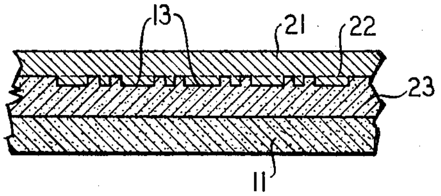
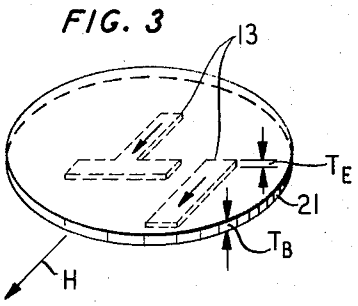
FIG. 4
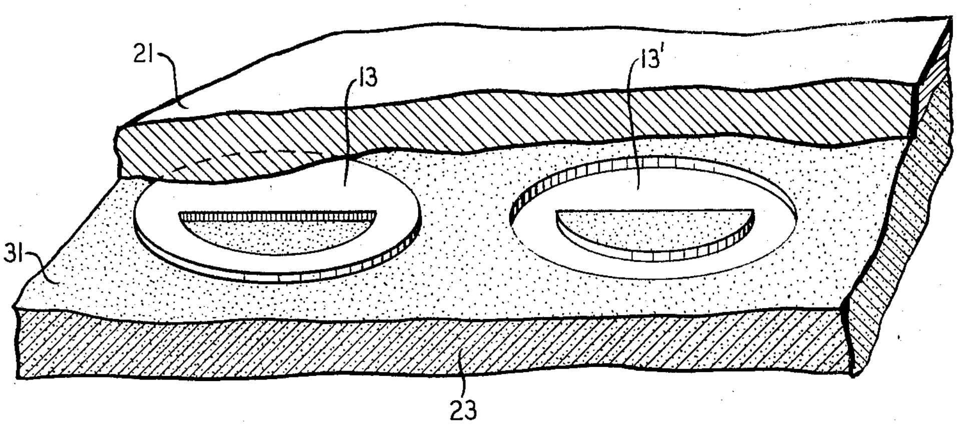

SINGLE WALL DOMAIN PROPAGATION ARRANGEMENT

FIELD OF THE INVENTION

This invention relates to information storage apparatus and, more particularly, to such apparatus in which information is stored as patterns of single wall magnetic domains commonly known as magnetic bubbles.

BACKGROUND OF THE INVENTION

U.S. Pat. No. 3,534,347, of A. H. Bobeck issued Oct. 13, 1970, discloses a single wall domain memory in which domain patterns are moved in a layer of material in what is known as a (field access) mode of propagation. The term "field access" characterizes a pattern of magnetic elements defined by a magnetically soft material adjacent the domain layer. The elements are of geometries to exhibit magnetic poles in the presence of a magnetic field in the plane of the domain layer. Moreover, the elements are disposed such that poles are produced in them in consecutively offset positions in response to reorientations of the in-plane field so that domains are moved from an input to an output position along a channel defined by the elements. For the familiar rotating in-plane field, whether achieved by sinusoidal fields in quadrature or by pulses, the familiar T-bar, Y-bar, or T-X magnetically soft element geometries are employed.

Typically, the elements are formed from a uniform permalloy film by photolithographic techniques. The film is deposited initially on a spacing layer of a thickness large enough to avoid excessive static forces between the elements and the domains and thin enough to ensure that the poles generated by the elements are sufficiently close to the domain layer to be effective in moving domains. In this connection, domains are maintained at an operating diameter by a bias field of a polarity to constrict domains. Since typical domain layers are characterized by a magnetization along an axis normal to the plane, a domain is magnetized antiparallel to a reference direction along that axis and the bias field is poled in the reference direction. The poles generated in the magnetic elements, then, are operative to modify the bias field locally to produce local magnetic field gradients which offset the domains associated with the elements. As the in-plane field rotates, poles are generated at the ends of the elements which have long dimensions aligned with the field direction. By disposing the elements so that consecutively offset elements have long dimensions aligned with consecutive orientation of the in-plane field, consecutively offset field gradients are operative as described.

The field access arrangement is particularly inexpensive and reliable because vast numbers of bit locations are defined in a single photolithographic process and no external connections are employed. But it does have some problems associated with it. One problem is that the propagate elements have demagnetizing fields associated with them which define a minimum drive field strength. Another problem is that the elements may not move domains smoothly so that during high-speed operation, a domain may stand still during one portion of a cycle and be mobility limited during another portion. Certainly, designs which permit a reduction in drive field strength and a greater versatility in element geometry are advantageous.

SUMMARY OF THE INVENTION

The present invention is directed at a field access arrangement which achieves both of these advantages by defining the propagate elements as embossed islands on a continuous magnetically soft film which we will refer to herein as the background film. The background film is of a thickness to saturate magnetically in the presence of the in-plane field and employs exchange coupling between the film and the various embossed elements to cause those elements to become saturated also. Since the demagnetizing field of the background film is much less than that of the individual propagate elements, a substantial reduction in in-plane field strength is realized. Since the embossed elements can be defined negatively also, that is as regions where material is removed from the background, an increased number of element designs are made feasible by the present approach.

In one specific embodiment of this invention, the familiar T-bar, field access circuit is defined as an embossed design on the face of a continuous permalloy background layer towards the domain layer. Relatively low-drive fields are shown to be realized. In another embodiment, embossed designs occur in two levels of the background layer, with both raised and sunken features operative in concert to move domains in response to a rotating (or consecutively radially reorienting) in-plane field.

BRIEF DESCRIPTION OF THE DRAWING

FIG. 1 is a schematic illustration of a field access arrangement in accordance with this invention, FIGS. 2 through 7 are schematic cross section, protection, and top views of alternative portions of the arrangement of FIG. 1, and FIGS. 8, 9, and 10 are schematic illustrations of arrangements implemented by embossed patterns in accordance with this invention.

DETAILED DESCRIPTION OF THE DRAWING

Figure 5:
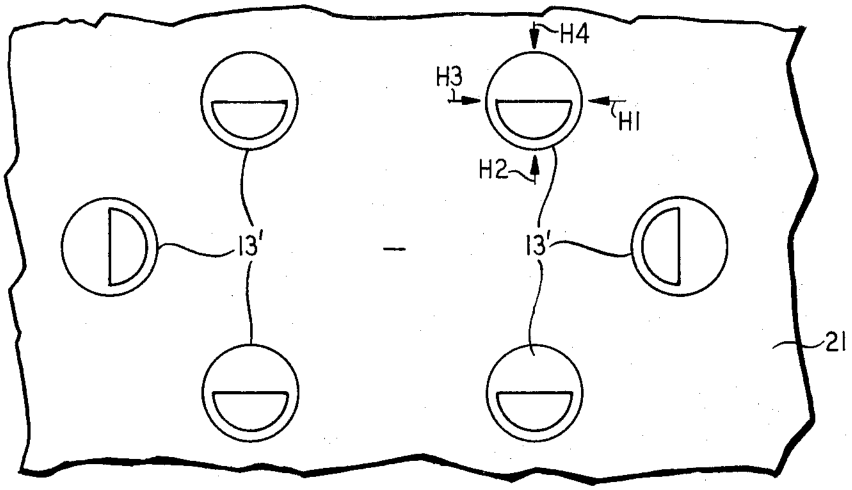

FIG. 1 shows a field access, domain propagation arrangement 10 in accordance with this invention. The arrangement includes a layer 11 in which single wall domains can be moved. A channel 12 is defined in layer 11 by a plurality of magnetic elements 13 shown illustratively of T- and bar-shaped geometry. Domains D move along the channel from left to right as viewed in response to an in-plane field rotating clockwise in the plane of layer 11 from an input position I to an output position O.

The in-plane field is supplied by a suitable source represented by block 14 in FIG. 1. A domain generator for providing a domain at I is represented by block 15 in FIG. 1 and apparatus for detecting domains at O is represented by arrow 16 directed at utilization circuit 17. The invention herein lies primarily in the structure of the channel-defining elements. Since suitable input and output arrangements are well known and since an understanding of such arrangements and their operation is not necessary for an understanding of this invention, a description thereof is omitted here.

A bias source for maintaining domains at an operative diameter is represented by block 18. The sources 14, 15, and 18 and circuit 17 are under the control of a control circuit, represented by block 20 of FIG. 1, for synchronization and activation.

The distinguishing features of a field access, domain propagation arrangement in accordance with an embodiment of this invention are apparent from FIG. 2. The figure shows a cross section of a portion of the arrangement of FIG. 1 taken along channel 12. The T- and bar-shaped elements 13 of FIG. 1 can be seen to extend downwards, as viewed, from a background film 21 of uniform thickness. Film 21, as well as the T- and bar-shaped elements, are illustratively of magnetically soft material, illustratively permalloy, forming an integral structure shown separated, for illustrative purposes only, by imaginary dotted line 22. This integral embossed structure is shown separated from domain layer 11 by a spacing layer 23 of aluminum oxide or silicon dioxide.

It is helpful to consider the magnetic properties of such a structure. Consider an element disk of layer 21 with representative T- and bar-shaped elements protruding therefrom as shown in FIG. 3. If the disk has a radius R and a thickness T, the resulting demagnetizing field is represented by $$\pi/4\ (T/2R)\cdot 4\pi M\ , \qquad (1)$$

For a typical film thickness of 0.6 micron and a disk diameter of 0.6 centimeter, the film saturates in the presence of an in-plane field of 0.78 oersted. The saturated magnetic state, if unmodified in the vicinity of the T- and bar-shaped elements, would produce magnetic poles where the magnetization has a nonzero component perpendicular to the edges of the elements. These poles would produce a demagnetizing field $H_D$ within the elements and also extending into the area of film 21 adjacent to the elements. It is well known that in the absence of an applied in-plane rotating field H, a lower energy state may be realized by the formation of domain tips. These domain structures define curling paths for the magnetization such that the magnetization becomes parallel to all the edges of the embossed elements. This curling of the magnetization would occur, however, in a large area of the background surrounding the elements. Thus the curling becomes energetically unfavorable in the presence of an in-plane rotating field H because the magnetization turns away from the direction in which H is applied over a large area of the background film. It seems probable that a domain tip structure is formed which cancels the magnetic poles in part, but which is also modified by the field H. The net magnetization $\overline{M}$ of the elements calculated by assuming a particular domain structure had the form $$\overline{M}/M \approx (\alpha\ H/H_D/1+\alpha\ H/H_D) \qquad (2)$$

where $M$ is the saturation magnetization and $\alpha$ depends on the geometry of the element and the area external to it where the magnetization is significantly turned away from the direction of $H$. The initial magnetization of the embossed elements proceeds as though their effective demagnetizing field were $$H_D^{eff} = H/\alpha\ . \qquad (3)$$

Now, $\alpha$ is large because of the area of the background film 21, affected by the unmodified domain tip structure is large. Thus a substantial decrease in the intensity of the rotating field $H$ can be realized by employing embossed elements to propagate magnetic bubbles. A significant degree of magnetization of the elements along the short dimensions is also within the design capabilities, in accordance with well-understood principles, and is desirable because it allows coherent rotation of the magnetization within the propagate elements thus eliminating undesirable harmonics which find their origin in the varying pole strengths of the elements when it occurs.

The embodiment of FIGS. 1 through 3 includes propagate elements extending only out from the surface of the background film 21. But propagate elements can also be formed in the opposite sense. A structure including such elements shown in FIG. 4 in a cross-sectional view as it would occur if taken along a channel like channel 12 of FIG. 1. Elements 13 and 13' are shown extending upward and downward from the lower face 31 of film 21, and are designated in general, as positive and negative, respectively.

Figure 6:
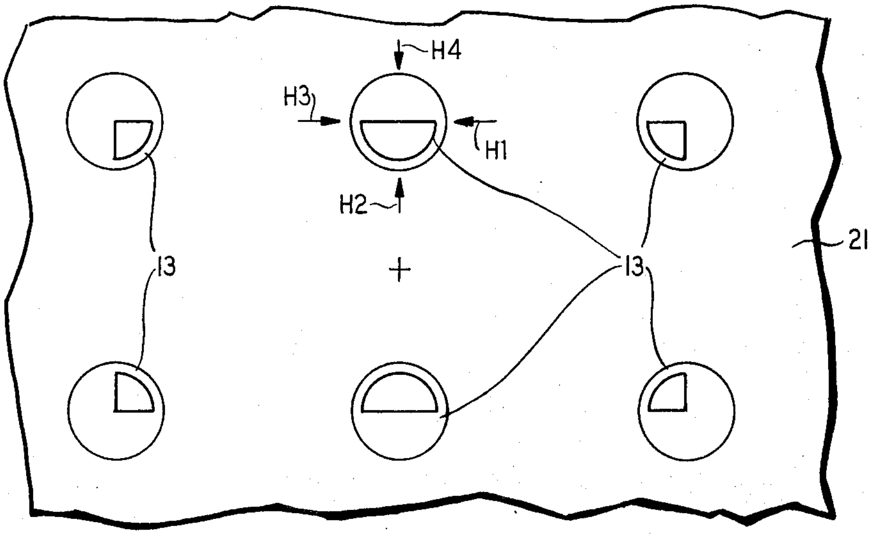
Figure 7:
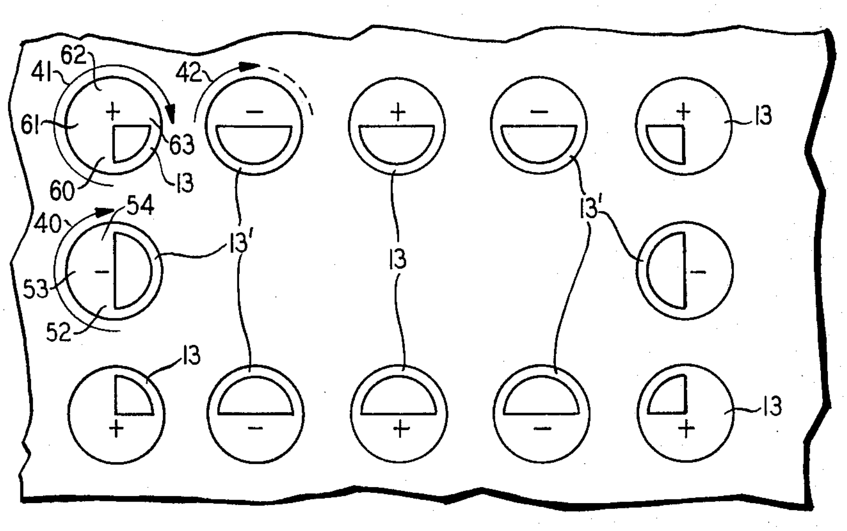

FIGS. 5 and 6 show negative and positive disks, respectively, which are employed in a single structure as shown in FIG. 7. It is to be understood, specifically, that a single structure is being discussed in FIGS. 4 through 7, that the top view of the structure is represented in FIG. 7, and that the negative elements 13' of FIG. 4 and the positive elements 13 of FIG. 4 are shown separately in FIGS. 5 and 6, respectively. The individual embossed features (elements) are basically disk-shaped of which half or quarter-moon shaped sections are omitted.

Operation is again responsive to a rotating in-plane field assumed to align with the consecutive in-plane field orientations represented in FIGS. 5 and 6 by the arrows H1, H2, H3, and H4. If we remember that the magnetization of film 21 rotates coherently everywhere in response to the in-plane field reorientations, we can appreciate that poles are generated at the periphery of the disks and that domains follow the poles about the disks as the field reorients. The operation is essentially that described in U.S. Pat. No. 3,555,527 of A. J. Perneski issued Jan. 12, 1971.

The omitted portions of the disks are designed to ensure transfer of a domain from one disk to the next, as the in-plane field reorients, by exposing a domain to opposite poles closely spaced and thus having little net effect. If we consider a negative disk with the in-plane field following the sequence H1, H2, H3, and H4 in FIG. 5, a domain follows the curve 40 through the positions 52, 53, and 54 shown in FIG. 7. The adjacent disk is a positive one. Consequently, the domain next follows arrow 41 through positions 60, 61, 62, and 63. Thereafter, the domain goes to element 71 and follows arrow 42 etc., as shown in FIG. 7. The arrangement of positive and negative disks in FIG. 7 defines a closed information loop for domains, each pair of positive and negative disks providing a stage of the channel. FIG. 1 indicates such a closed loop path by broken line CLP.

A most promising organization for field access, single wall domain memories is called the "major-minor" organization and is described in U.S. Pat. No. 3,618,054 of P. I. Bonyhard et al., issued Nov. 2, 1971. In the major-minor organization, domains are transferred from a set of minor loops, where they are recirculated, to a single major loop for write and read operations. For implementing this particularly attractive organization, a variety of functions are necessarily performed. For example, the transfer function for loop to loop transfer is necessary. Also domain generation is necessary and replication is particularly desirable. These three functions will now be shown implemented by positive and negative embossed elements on a uniform magnetically soft film.

Figure 8:
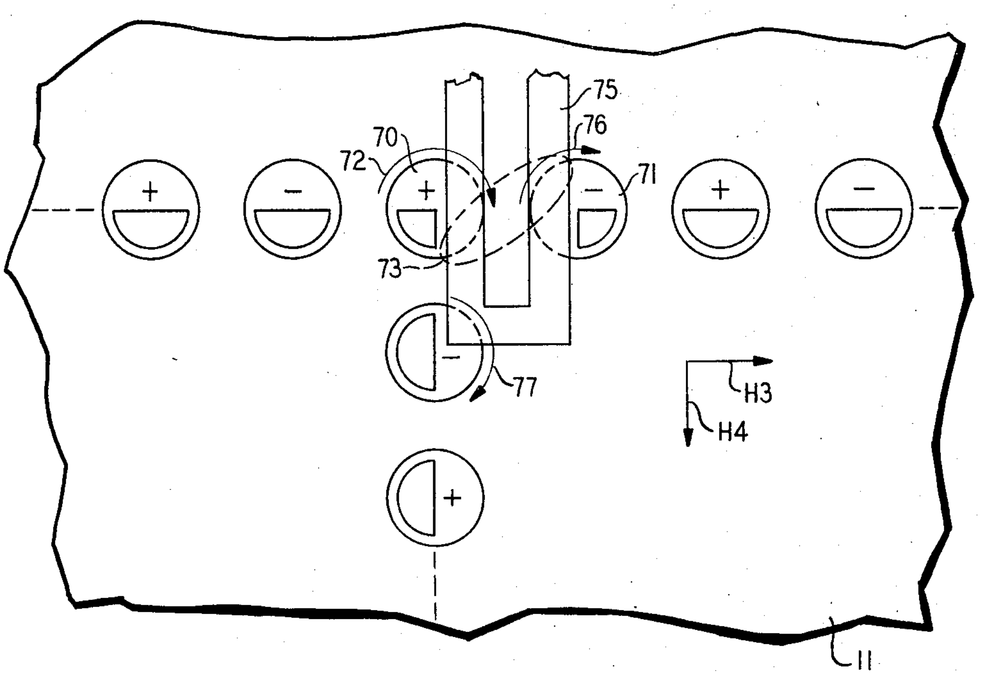

The generation and replication functions depend on the elements being designed so that two adjacent elements attract a single domain at the same time in order to strip out a domain. This is accomplished, for example, by extending the solid portions of adjacent positive and negative elements so that the omitted portions in them are quarter moon in shape as shown in FIG. 8 by elements 70 and 71. A domain moving from left to right about positive element 70 as indicated by arrow 72 in the figure stretches into a strip as indicated by broken loop 73 as the in-plane field reorients from the direction of arrow H3 to that of arrow H4. A pulse on conductor 75 at this juncture divides the strip into two domains. One of the resulting domains follows arrow 76 to the right, the other following arrow 77 downward.

Figure 9:
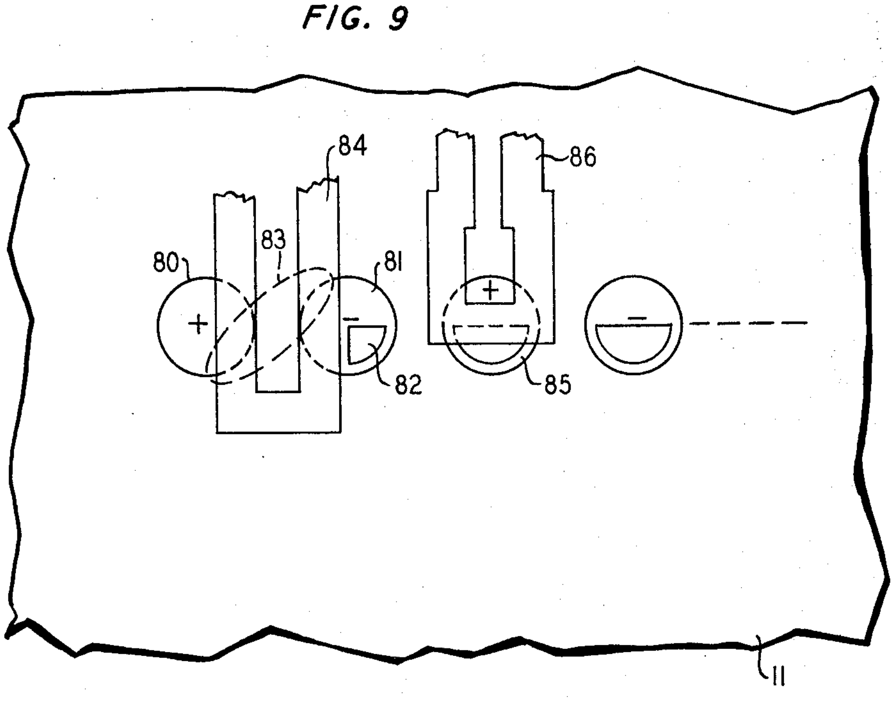

FIG. 9 shows a solid positive element 80 adjacent a negative element 81. The latter has a quarter moon recess. A domain moving constantly about the periphery of element 81 strips out into a form indicated by broken loop 83 during each fourth phase of the in-plane field cycle. At this juncture, conductor 84 is pulsed to divide the strip into two domains, one continuing to circle element 80 as a seed domain. The other domain advances to the right for selective annihilation at element 85 during a second phase of the in-plane field cycle in response to a pulse applied to conductor 86.

Figure 10:
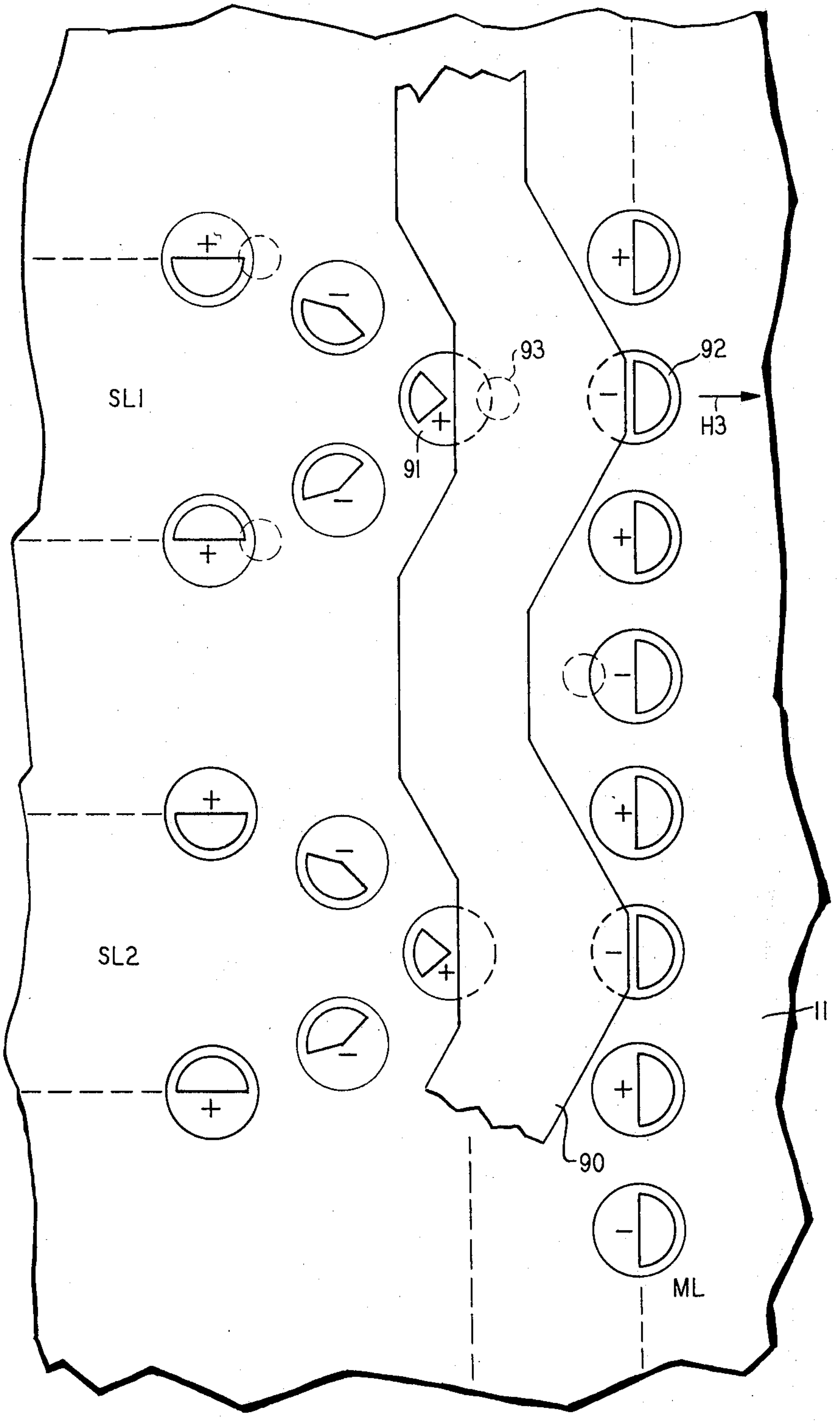

FIG. 10 shows a portion of a major-minor memory organization defined by positive and negative magnetic elements. The portion shown is that area where transfer of domains occurs between minor loops SL1 and SL2 and major loop ML. A conductor 90 is disposed between elements 91 and 92, for example. A domain 93 recirculating clockwise in loop SL1 arrives at the position shown during a third phase of an in-plane field cycle. At this juncture, conductor 90 is pulsed for transfer of the domain to element 92 prior to movement of the domain upward in loop ML as viewed. Naturally, since conductor 90 couples all such transfer positions, similar domain transfer occurs simultaneously between all minor loops and the major loop. The return of domains to vacancies in the minor loops also occurs during a third phase of the in-plane field. But the pulse applied to conductor 90 is poled in the opposite direction.

The formation of embossed circuits is achieved conveniently by means of familiar ion milling techniques. A uniform film of permalloy is first protected by a photoresist layer, polymerized in accordance with a pattern, washed to remove the unpolymerized portions of the layer, and subsequently exposed to ion bombardment, thus forming the positive elements. Negative elements are formed by similar photoresist techniques by, for example, selectively ion milling a silicon dioxide spacing layer on the surface of an epitaxially grown domain layer. The resulting pattern is then covered with permalloy.

In one specific embodiment, positive and negative propagate elements are formed on an epitaxial film of $YEu_2Al_1Fe_4O_{12}$ formed from the liquid phase on a substrate of $Gd_3Ga_5O_{12}$. A film having a thickness of 6 microns exhibits domains having diameters of 4–9 microns in the presence of a bias field of 100–120 oersteds. A layer of silicon dioxide having a thickness of 1 micron covers the film and is selectively reduced to form the negative (pattern) of the pattern shown in FIG. 5 by selective ion milling through exposed photoresist layer. The ion milling is carried out in two steps, one to define elements 13' of FIG. 4, the other to define face 31. The pattern has a thickness of 0.2 micron and each element has a diameter of 11 microns. Permalloy is deposited over the structure to form the pattern of FIG. 5 and the photoresist is removed. Movement of domains is achieved in response to an in-plane field of > 3 oersteds. This in-plane field is to be compared with a typical value of > 15 oersteds for permalloy patterns in the absence of a background layer.

Inasmuch as the permalloy elements are mechanically integral with the background film, they are expected to adhere quite well, thus avoiding any problems in adherence which might occur with mechanically nonintegral elements when particularly small dimensions are reached.

What has been described is considered merely illustrative of the principles of this invention. Therefore, various modifications can be devised by one skilled in the art in accordance with those principles within the spirit and scope of this invention.

What is claimed is:

1. Magnetic apparatus comprising a first layer of material in which single wall domains can be moved, and means for moving domains along a channel in said layer, said means comprising a second layer of magnetically soft material coupled to said first layer and a first pattern of magnetically soft elements mechanically integral with said second layer at a first face thereof for moving domains therealong in response to a magnetic field reorienting in the plane of said first layer.

2. Apparatus in accordance with claim 1 also including a second pattern of magnetically soft elements mechanically integral with said second layer at a second face thereof.

3. Apparatus in accordance with claim 2 also including a nonmagnetic spacing layer between said first and second layers.

4. Apparatus in accordance with claim 3 wherein said spacing layer is embossed to mate with said second pattern of elements.

5. Apparatus in accordance with claim 4 wherein said elements of said first and second patterns are of geometries and are so disposed to cooperate to move domains along a channel defined thereby responsive to said magnetic field.

6. Apparatus in accordance with claim 2 wherein said second layer is of a thickness to saturate magnetically in the presence of said magnetic field.

7. Apparatus in accordance with claim 6 wherein said pattern of magnetically soft elements is exchange-coupled to said second layer.

* * * * *